Sept. 20, 1971    A. C. DAVIS    3,606,058
CASE CUTTING MACHINE
Filed Dec. 18, 1968    11 Sheets-Sheet 1

Fig. 1.

Inventor:-
Allan C. Davis,
By Hibben, Noyes & Bicknell
Attys.

United States Patent Office 3,606,058
Patented Sept. 20, 1971

3,606,058
CASE CUTTING MACHINE
Allan C. Davis, Baltimore, Md., assignor to
The Meyercord Co., Wheaton, Ill.
Filed Dec. 18, 1968, Ser. No. 784,776
Int. Cl. B65b 69/00
U.S. Cl. 214—305
22 Claims

ABSTRACT OF THE DISCLOSURE

This disclosure deals with a machine for automatically cutting a case into two parts and breaking the two parts apart to make the contents of the case accessible. The machine moves a case in a first direction between a pair of spaced cutting blades which slit two sides of the case. The case is then moved in a second direction between a second pair of cutting blades which slit another two sides of the case, the second direction being at an angle to the first direction. The four blades are located in a single plane, thus dividing the case into two parts. The portion of the machine which moves the case in the second direction is also operable to break the two parts of the case apart after the case has been moved past the second pair of blades.

---

Numerous machines have been designed for opening cases, such as cardboard boxes, filled with articles of some sort. For example, U.S. Pat. No. 2,729,885 to Wahl et al. discloses a semi-automatic machine for making slits in four sides of a cardboard box so that the box is divided into two or more parts and may be opened. The principal disadvantage of such machines is that some manual operation is required. The machine disclosed in the above patent, for example, is designed to make successive slits in a box but the box must be manually turned between slitting operations, and, further, the two parts of the box formed by the slitting operation must be manually broken apart.

In accordance with the present invention, the foregoing disadvantages are avoided by providing a fully automatic machine which divides a case into two parts and breaks the two parts apart. A machine embodying the invention comprises first and second pairs of spaced cutting blades, all of said blades being located in one plane and said second pair of blades being spaced from said first pair of blades, first moving means for moving a case to be cut in one direction between said first pair of blades in order to slit two sides of the case, and second moving means for moving said case at an angle to said one direction between said second pair of blades to slit two other sides of the case, whereby four adjoining slits are formed in the case to divide the case into two parts, said second moving means being further operable to break said two parts of the case apart.

Further objects and advantages of the present invention will be apparent from the following detailed description taken in conjunction with the accompanying figures of the drawings, wherein.

In greater detail, a case cutting machine embodying the invention comprises a frame 20 (FIGS. 1 and 2) which supports the other parts of the machine, a vertically movable elevator 21 designed to lift a case upwardly between a pair of horizontally spaced rear and forward blades 22 and 23 (FIG. 3), a breaker mechanism 24 positioned above the elevator 21 and adapted to receive a case from the elevator 21, a pair of vertically spaced bottom and top knives 26 and 27 (FIG. 3), a carriage for moving the breaker mechanism 24 and a case forwardly between the two blades 26 and 27 and onto a plate 28 (FIGS. 2 and 3), the breaker mechanism further breaking the case into two separate parts while it is on the plate 28, the plate 28 then moving downwardly with the broken case and depositing the broken case on a dumping mechanism 29, and an outfeed table 30 (FIG. 1) which receives the broken case from the dumping mechanism 29.

Figures 10, 11, 12, 13:
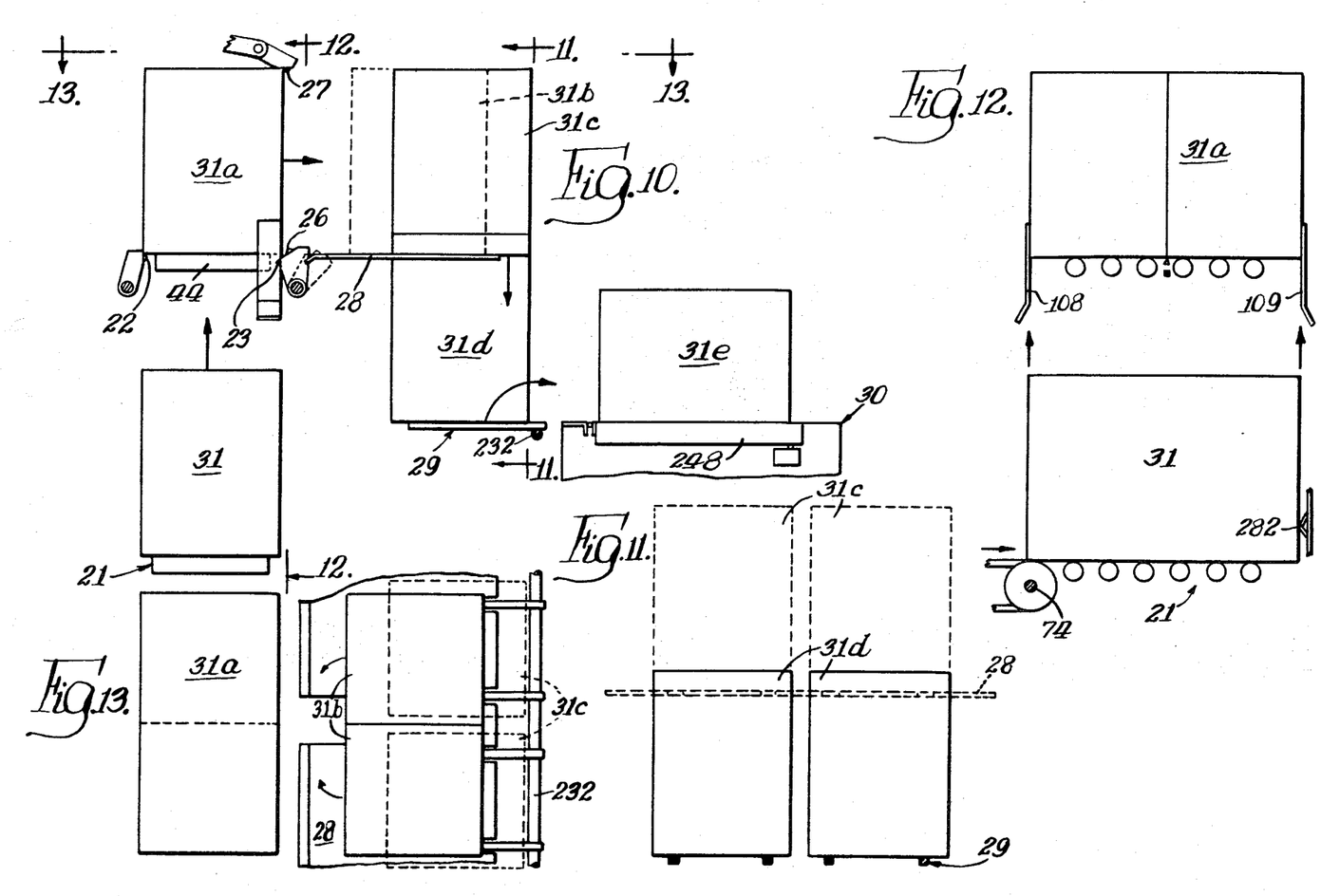
FIG. 10 is a schematic diagram illustrating the operation of the machine.
FIG. 11 is a view taken on the line 11—11 of FIG. 10.
FIG. 12 is a view taken on the line 12—12 of FIG. 10.
FIG. 13 is a view taken on the line 13—13 of FIG. 10.

With reference to FIGS. 10 to 13, the operation of the machine is briefly as follows: a carton, indicated by the numeral 31 is positioned on the elevator 21 and upward movement of the elevator 21 causes the carton 31 to move vertically between the two blades 22 and 23, the two blades 22 and 23 being located to make vertical slits in the forward and rear sides of the case 31 at the center of the case. The case, when in its upper position and when still on the elevator 21, is indicated by the numeral 31a. The breaker mechanism 24 moves the carton horizontally forwardly, or toward the right as seen in FIG. 10, between the two vertically spaced blades 26 and 27 to the dashed line position indicated by the numeral 31b. The forward movement of the case between the two blades 26 and 27 causes slits to be formed in the top and bottom sides of the case. The four blades 22, 23, 26 and 27 are located in a single vertical plane, and movement of the carton through the positions described above results in a continuous slit being formed around the case, the slit dividing the case into two parts. With the case on the plate 28, the breaker mechanism shifts to break the two parts of the case apart and to position the two parts in the solid line position indicated by the numeral 31c in FIG. 10. The plate 28 then moves downwardly and positions the case on the dumping mechanism 29 at the position indicated by the numeral 31d. The dumping mechanism 29 then pivots clockwise, as seen in FIG. 10, and dumps the two parts of the case on the table 30 in the position indicated by the numeral 31e. Subsequent handling of the case on the table 30 may be done manually or by automatic means.

The following is a more detailed description of the various parts of the machine. The frame 20 comprises a plurality of vertical structural members and a plurality of horizontal structural members 37 (FIGS. 1 and 2), the members 36 and 37 being secured together as by welding to form a rigid framework which supports the various parts of the machine. A vertical member 36 is provided at each corner of the machine, and the corner members include downwardly extending legs 38 which have vertically adjustable feet 39 (FIG. 2) suitable for levelling of the machine. The frame 20 further includes removable panels 41 which enclose the rear portion of the machine, where the power drive mechanisms and the electrical controls of the machine are located.

The elevator 21 comprises a plurality of horizontally extending rollers 44 (FIGS. 1, 8 and 9) which are rotatably supported at their ends by a pair of vertically extending brackets 46. The brackets 46 in turn are supported by a plurality of horizontally extending braces 47 and diagonally extending braces 48 (FIGS. 2, 3 and 9) which are secured together as by welding. The braces 47 and 48 are secured to a pair of laterally spaced, vertically extending runners 49, the braces extending forwardly from the runners 49. Each runner 49 has rollers 51 (FIG. 3) rotatably connected to the upper and lower ends thereof, the rollers 51 being positioned in channel shaped guides 52 secured to the frame 20 of the machine. The vertically spaced rollers 51 are movable in the guides 52 and hold the braces 47 and the rollers 44 in horizontal forwardly extended positions during vertical movement of the elevator.

Figure 2:
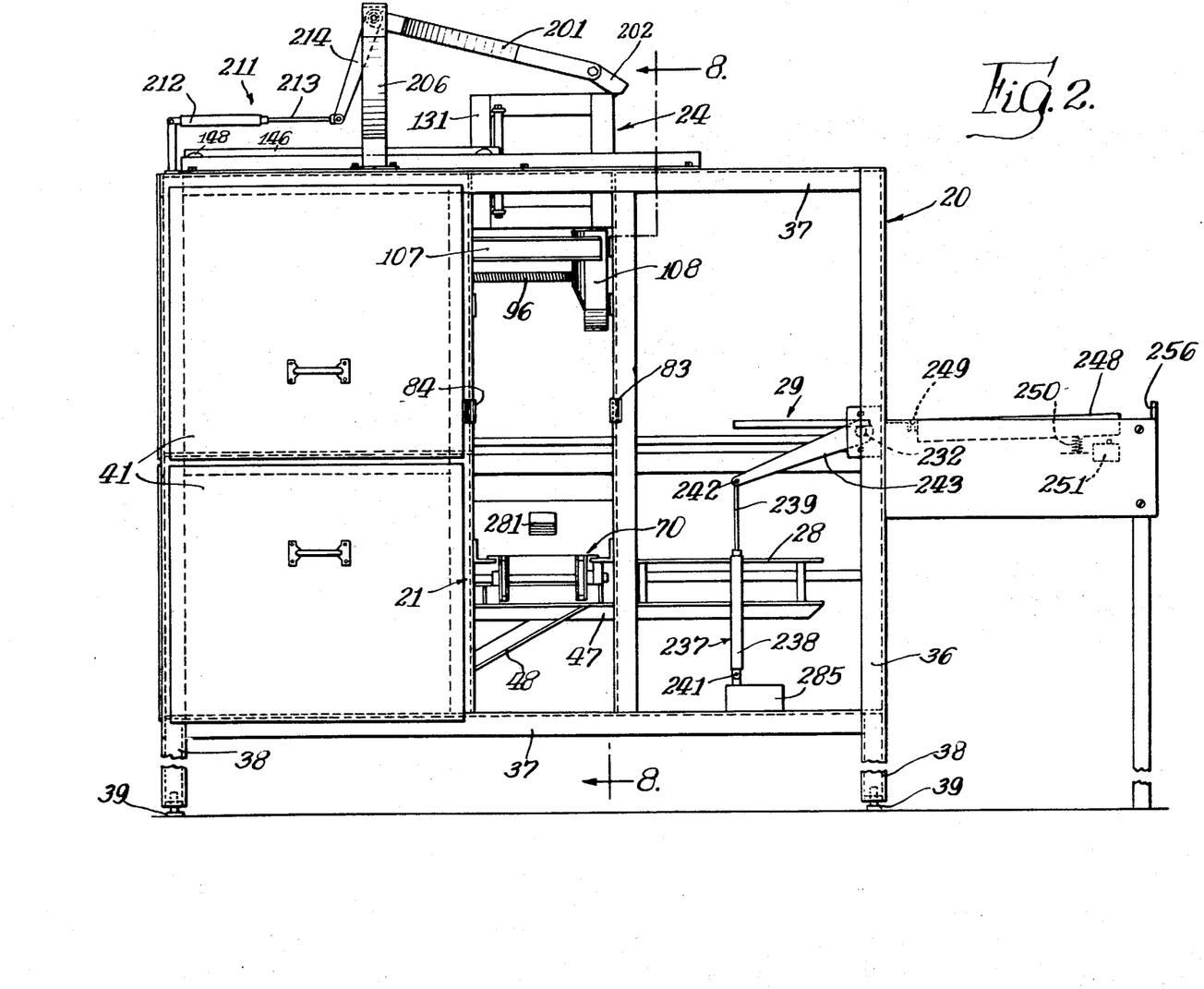
FIG. 2 is a side elevational view of the machine.
Figure 3:
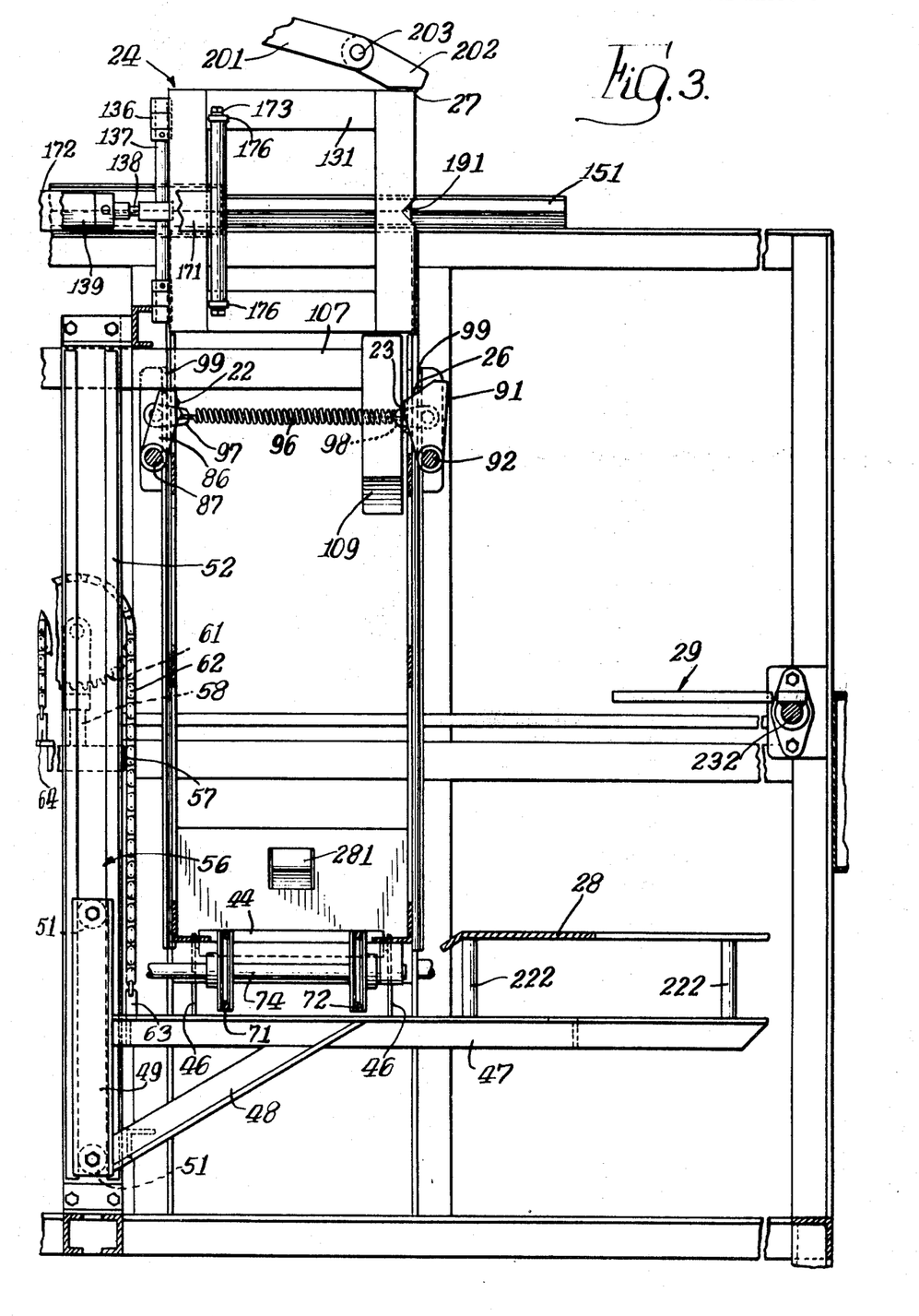
FIG. 3 is an enlarged fragmentary view of a portion of the machine shown in FIG. 2.

As shown in FIGS. 2 and 3, the braces 47 extend forwardly of the rollers 44 and support the plate 28 on the upper side thereof. The upper surfaces of the rollers 44 and the plate 28 are at substantially the same level so that a case on the rollers 44 may be pushed forwardly from the rollers to the plate 28, as will be described hereinafter.

Figure 4:
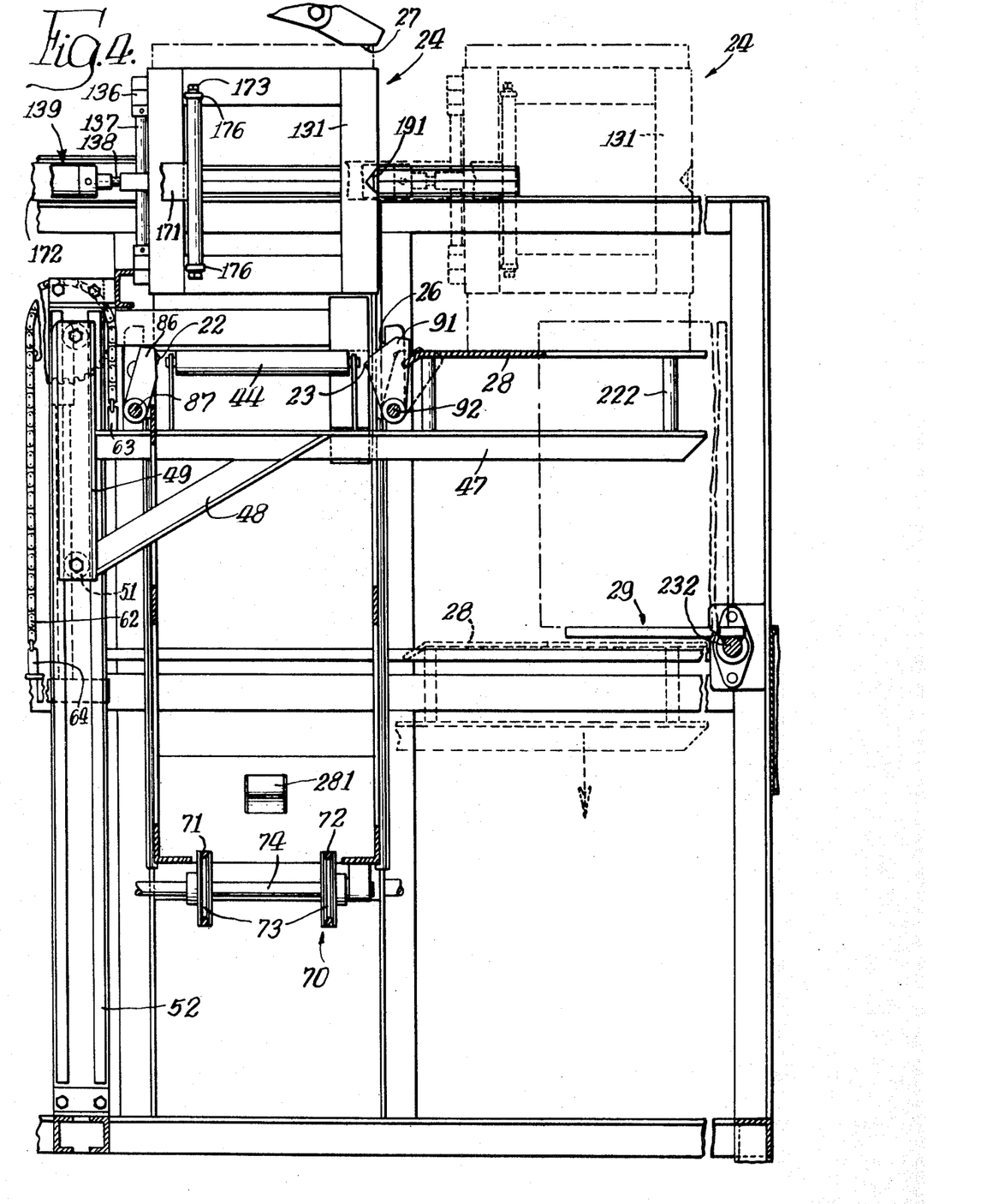
FIG. 4 is a view similar to FIG. 3 but showing a different position of the parts.

The elevator further includes means for moving the rollers 44 between a lower position, shown in FIGS. 2 and 3, and an upper position, shown in FIG. 4, such means comprising a pneumatic device 56 (FIGS. 3, 8 and 9) including a vertically extending cylinder 57 and a piston rod 58. The cylinder 57 is secured to the frame of the machine behind the rollers 44 and between the two guides 52, and the rod 58 extends upwardly from the cylinder. A yoke 59 (FIG. 8) is secured to the upper end of the piston rod 58 and rotatably supports a sprocket 61 (FIG. 9) between the arms thereof. A chain 62 is looped over the sprocket 61 and has one end 63 connected to the support for the rollers 44 and its other end 64 anchored to a bracket 65 which is secured to the upper end of the cylinder 57.

Considering the operation of the elevator, when air under pressure is admitted to the cylinder 56 underneath its piston, the rod 58 and the sprocket 61 are forced upwardly. Since the end 64 of the chain 62 is held stationary, its outer end 63 and the rollers 44 secured thereto must move upwardly, such movement further causing turning movement of the sprocket 61. Thus, extension of the rod 58 from the cylinder 51 causes the rollers 44, and a case positioned thereon, to move upwardly, and subsequent retraction of the rod 58 causes the rollers 44 to move downwardly to receive another case.

Figure 1:
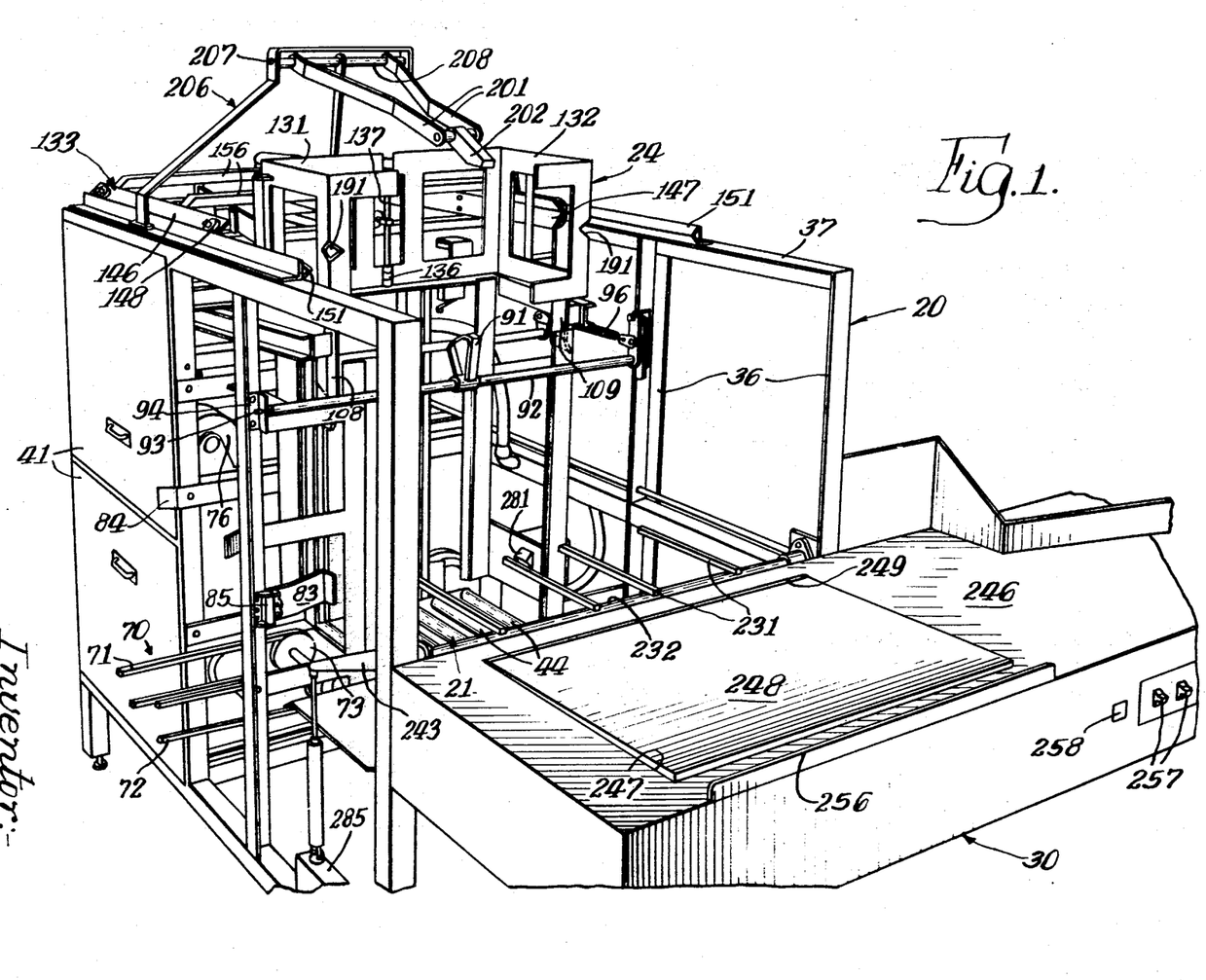
FIG. 1 is a perspective view of a case cutting machine embodying the invention.
Figure 8:
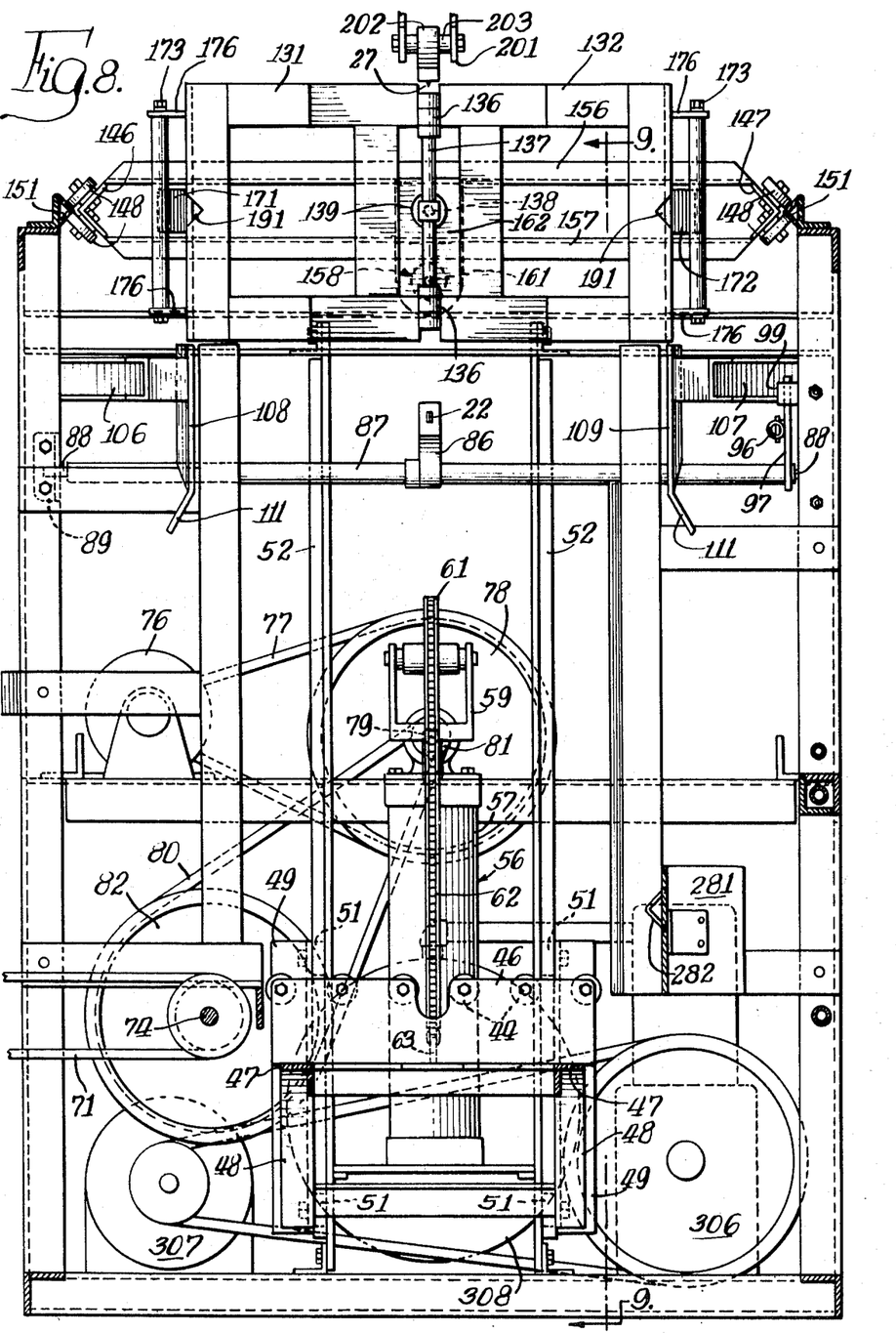
FIG. 8 is an enlarged sectional view taken on the line 8—8 of FIG. 2.

Cases may be fed onto the rollers 44 of the elevator 21 by any convenient means. In the present instance, a belt-type infeed conveyor 70 (FIGS. 1 and 2) is provided comprising a pair of endless belts 71 and 72 and four pulley wheels 73 (only two of the wheels 73 being shown). The two wheels 73 shown in the drawings are rotatably mounted on the frame 20 of the machine by a horizontal axle 74 (FIG. 8). The two belts 71 and 72 extend from the wheels 73 out of the frame 20 through an opening between the structural members 36 and 37, and the upper surfaces of the belts 71 and 72 are at approximately the same level as the upper surfaces of the rollers 44 of the elevator 21 when the rollers are in the lower position. Thus, a case placed on the two belts 71 will be moved onto the rollers 44 of the elevator 21 when the wheels 73 are rotated in the clockwise direction as seen in FIG. 1.

The conveyor 70 is connected to be driven by an electric motor 76 (FIG. 8) which is mounted on the frame 20 of the machine behind the elevator 21 and the infeed conveyor 70. The motor 76 is connected by a V-belt drive to the axle 74, the drive comprising a belt 77 connected between a pulley on the shaft of the motor 76 and a pulley 78 fastened to a shaft 79, the shaft 79 being rotatably mounted on the frame 20. A second V-belt 80 is connected to be driven by another pulley 81 on the shaft 79 to drive a pulley 82 secured to the axle 74. Thus, when the motor 76 is energized for clockwise rotation as seen in FIG. 8, the belts 77 and 80 and the axle 74 are also driven in the clockwise direction.

Figure 7:
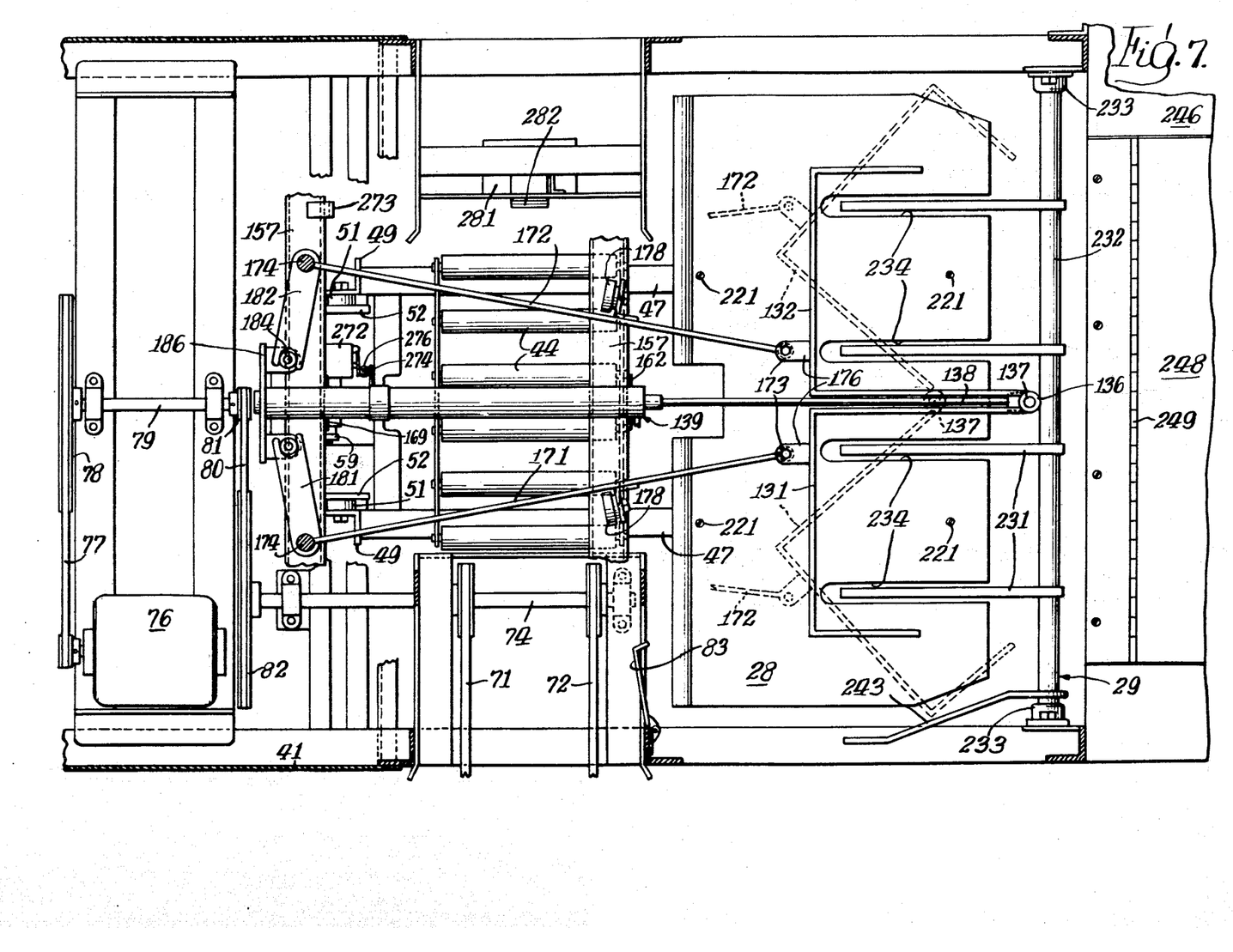
FIG. 7 is another view similar to FIG. 5 but showing still another position of the parts.

After a case has been moved onto the rollers 44, a spring arm 83 (FIG. 1) snaps inwardly behind the case and prevents the case from moving on the elevator. The pivotal connection 85 of the arm 83 with the frame includes a spring which urges the arm 83 in the counterclockwise direction as seen in FIG. 7.

With reference to FIG. 3, the two blades 22 and 23 are positioned on opposite sides of the path of travel of the rollers 44 of the elevator 21. The blade 22 is fastened to a blade holder 86 which is secured to a horizontally extending shaft 87. As shown in FIG. 8, the shaft 87 is rotatably mounted on the frame 20 of the machine by pins 88 fastened to its ends and received in mounting brackets 89 fastened to the frame 20.

The other blade 23 is fastened to another holder 91 which is pivotally mounted on the frame 20 of the machine by a shaft 92. As shown in FIG. 1, the shaft 92 has pins 93 secured to its ends which extend into mounting brackets 94 fastened to the frame 20 for rotatably supporting the shaft 92.

The two blades 22 and 23 are thus able to pivot on horizontal parallel axes. The two blades 22 and 23 are biased toward each other by a tension spring 96 (FIGS. 1, 2 and 3) which extends horizontally at one side of the machine and is connected at its ends to brackets 97 and 98 which in turn are rigidly secured to adjacent ends of the shafts 87 and 92 on the upper sides thereof. Stops 99 on the frame 20 adjacent the brackets 97 and 98 limit the extent of inward movement of the blade holders 86 and 91. When the brackets 97 and 98 are in engagement with the stops 99, the distance between the two blades 22 and 23 is slightly less than the width of a case to be cut. As shown in FIG. 3, the portions of the blade holders which are below the blades angle upwardly and toward each other, and these portions form cam surfaces of the blade holders. As a case to be cut is moved upwardly by the elevator 21, its upper corner edges engage the cam surfaces of the blade holders 86 and 91 and cam the two holders 86 and 91 away from each other against the force of the spring 96. The holders 86 and 91 slide on the outer surfaces of the case but the blades 22 and 23 cut through the sides of the case as the case is moved upwardly. It is of course necessary to adjust the distance each blade extends out of its holder relative to the thickness of the wall of the case so that the blades do not extend into the interior of the case and damage the articles in the case.

When a case to be cut is moved onto the rollers 44 of the elevator 21 by the infeed conveyor 70, the upper side of the case is below the blades 22 and 23, and after the elevator 21 has moved the case to its upper position, the lower side of the case is spaced above the level of the blades 22 and 23.

Where it is desired that slits be formed at precise locations on the case, a centering mechanism is preferably provided to laterally adjust the position of a case relative to the knives as the elevator is moving upwardly. The centering mechanism comprises a pair of centering arms 106 and 107 (FIGS. 6 and 8) having vertically extending shoes 108 and 109 secured to the forward ends thereof. The lower ends of the shoes 108 and 109 are angled laterally outwardly and downwardly, as at 111 (FIG. 8), so that a case moving upwardly between the shoes will first engage the angled portions 111 of the shoes and be centered between them.

Figure 6:
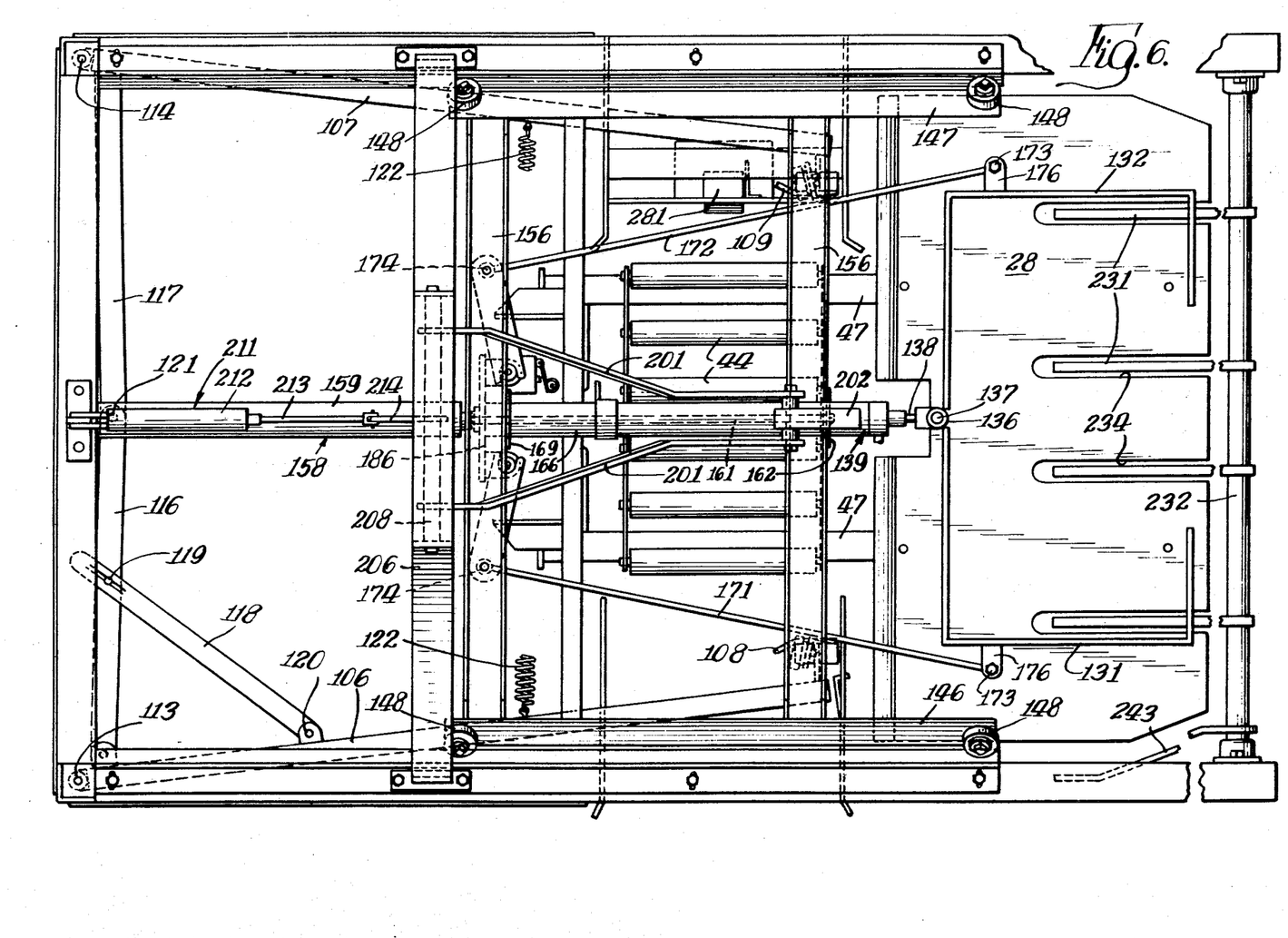
FIG. 6 is a view similar to FIG. 5 but showing a different position of the parts.

To properly center a case, it is important that the two shoes 108 and 109 move equal distances from the plane of the blades as a case is moving upwardly, and this is accomplished by interconnecting the rearward ends of the arms 106 and 107. With reference to FIG. 6, from the shoes 108 and 109 the two centering arms 106 and 107 angle rearwardly and outwardly toward the adjacent rearward corners of the frame and are pivotally connected at 113 and 114 to the frame. The rearward ends of the arms 106 and 107 are also connected together by two laterally extending cross arms 116 and 117 which are respectively secured to the centering arms 106 and 107. The cross arm 117 is rigidly secured, as by welding, to the centering arm 107, and the cross arm 116 is adjustably secured to the centering arm 106 by a link 118 which angles between the two arms 106 and 116. The link 118 is pivotally connected by a pin 120 to the arm 106 and is adjustably connected to the cross arm 116 by a screw 119. An elongated slot is formed in the rearward end of the link 118 so that the angle formed between the two arms 106 and 116 may be adjusted.

The inner ends of the cross arms 116 and 117 cross each other and are loosely connected together by a bolt 121. A hole is formed in the end of one cross arm and receives the bolt 121, and a slot is formed in the other cross arm and also receives the bolt. Thus, the adjacent ends of the cross arms 116 and 117 may shift relative to each other as the bolt moves in the slot while, nevertheless, the arms 116 and 117 must move equal angular distances as the shoes 108 and 109 are spread apart. Due to this connection between the arms 106 and 107, the shoes 108 and 109 must always be located equal distances from a center line.

The shoes 108 and 109 are biased toward each other by a laterally extending tension spring 122 (FIG. 6) which is connected to approximately the mid points of the two centering arms 106 and 107.

Thus, as a case is moved upwardly by the elevator, the two shoes 108 and 109 engage opposite sides of the case and center the case between them before the case reaches the blades 22 and 23. The plane of the blades 22 and 23 is, in the present instance, midway between the shoes 108 and 109, and therefore the case will be cut midway between the sides of the case.

The breaker mechanism 24 comprises two hingedly connected sections 131 and 132 (FIGS. 1, 6 and 8), and a carriage 133 for moving the two sections 131 and 132 from a rear position, shown in full lines in FIG. 4, where the sections are located directly above the rollers 44 of the elevator 21, and a forward position, shown in dashed lines in FIG. 4, where the two sections 131 and 132 are located above the plate 28. The breaker mechanism 24 further includes a mechanism for swinging the two sections 131 and 132 open to break a severed case apart when the case is on the platform 28.

Figure 5:
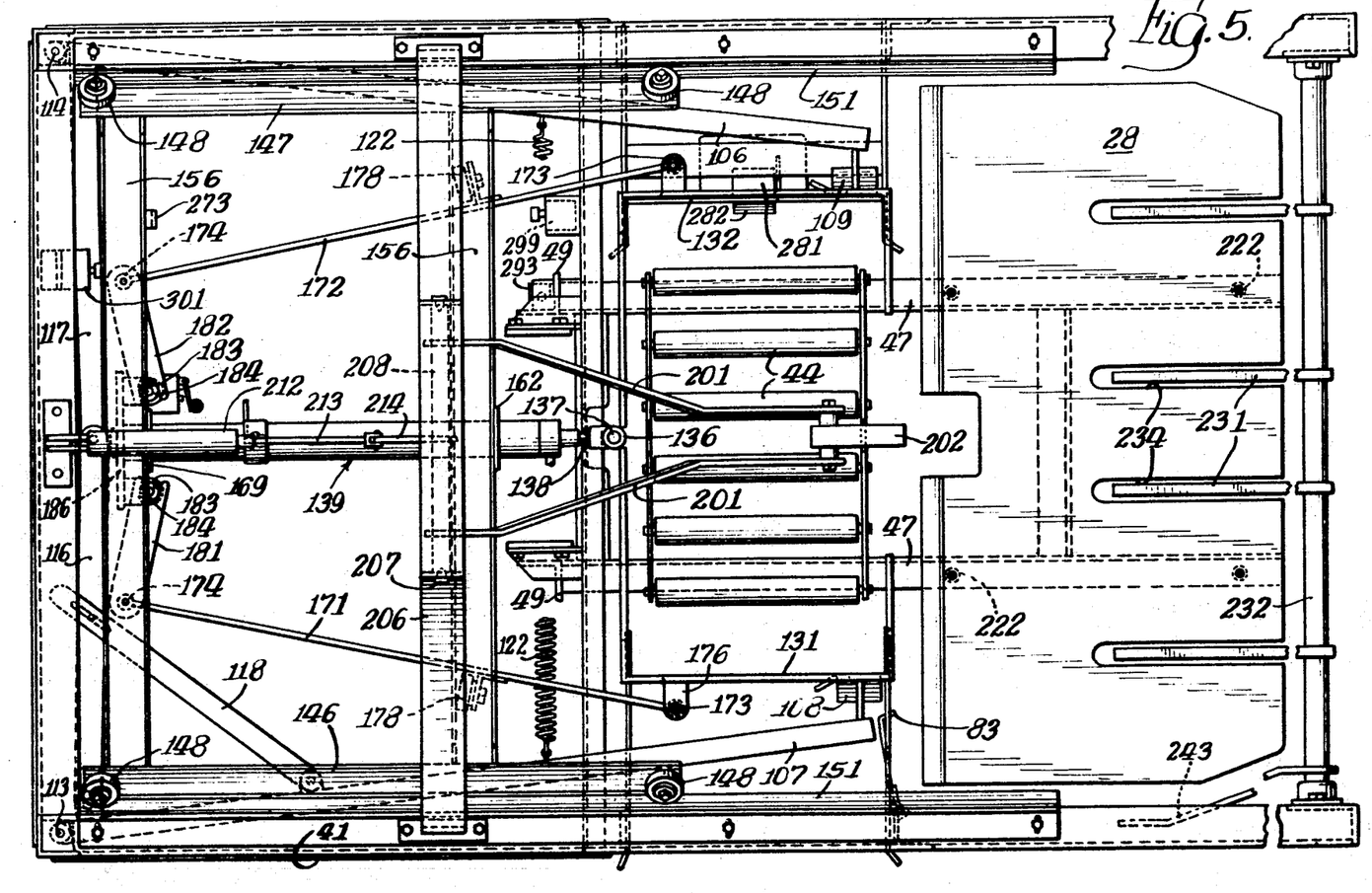
FIG. 5 is an enlarged fragmentary top elevational view of the machine.

As shown in FIGS. 1 and 5, each of the two sections 131 and 132 is generally C-shaped, and when the sections are in the rear position above the rollers 44, the arms of the two sections extend toward each other and the two sections together form a rectangle when view from above. The rearward arms of the two sections are hinged together at 136 by a vertically extending pin 137 (FIGS. 4 and 6), the pin 137 further being connected to the forward end of the piston rod 138 of a longitudinally extending pneumatic device 139 (FIG. 5) to be described in greater detail hereinafter, the device 139 forming part of the mechanism for swinging the sections 131 and 132 open.

The carriage 133 supports the two sections 131 and 132 for longitudinal movement on the machine and comprises a pair of laterally spaced roller mounting brackets 146 and 147 (FIG. 1), each of the brackets having mounted thereon four rollers 148. As shown in FIG. 8, the rollers 148 are connected in pairs to opposite ends of the brackets 146 and 147 of the carriage. The pivotal axes of the two rollers of each pair form a 90-degree angle between them, and the axis of each roller forms a 45-degree angle with a horizontal plane. The two pairs of rollers at each side of the carriage are supported by a track 151 in the form of an angle, the upper wheels being on top of the associated track and supporting the weight of the carriage 133 while the lower wheels are under the track and prevent the carriage from tipping.

Figure 9:
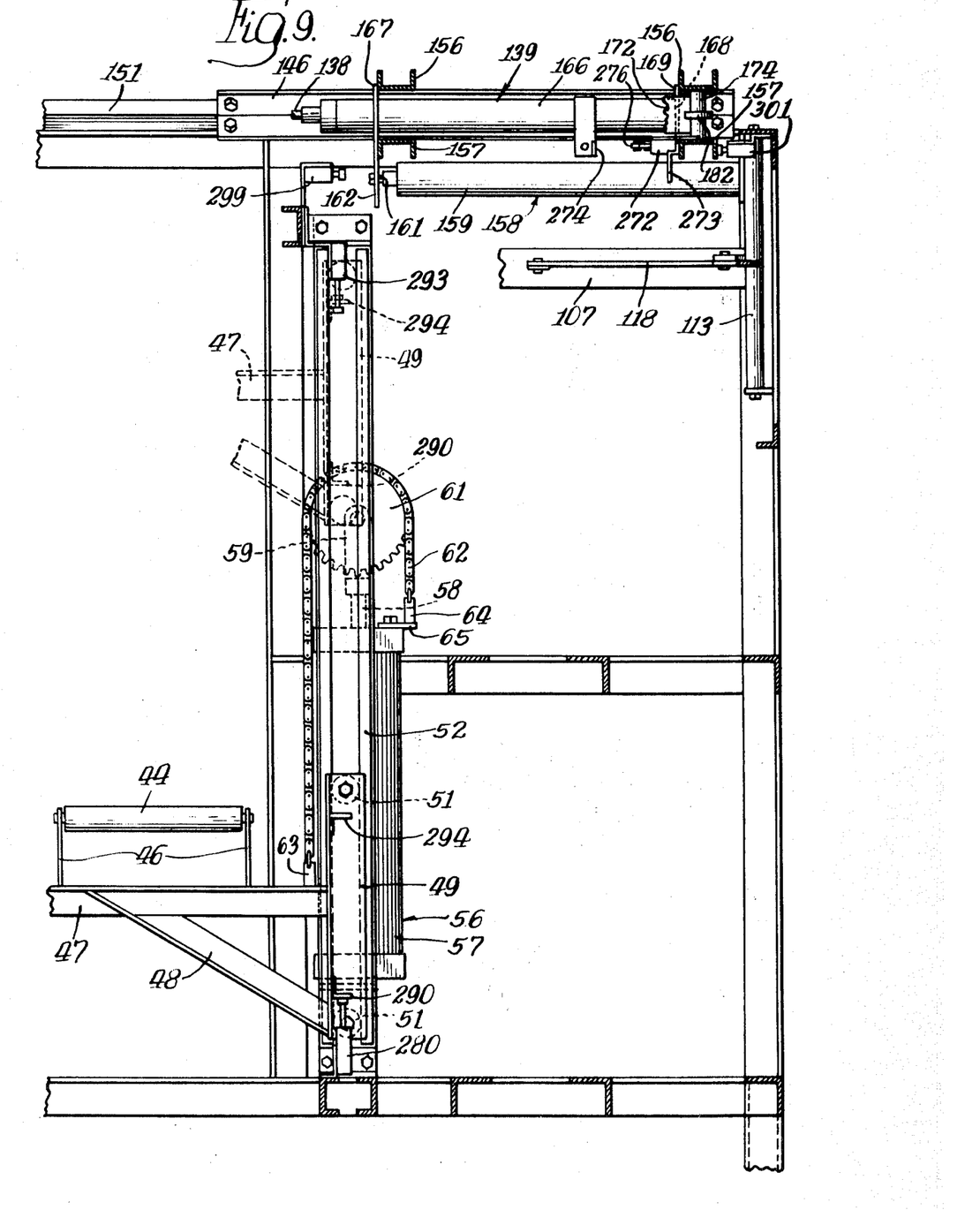
FIG. 9 is an enlarged sectional view taken on the line 9—9 of FIG. 8.

The two laterally spaced, longitudinally extending brackets 146 and 147 of the carriage are rigidly interconnected by a rearward pair of channel-shaped cross braces and a forward pair of channel-shaped cross braces, the upper cross brace of each pair being indicated by the numeral 156 (FIG. 8) and the lower cross brace of each pair being indicated by the numeral 157. As shown in FIGS. 8 and 9, the cross braces 156 and 157 extend laterally of the machine and the longitudinally extending pneumatic device 139 is mounted between the two cross braces 156 and 157 of each pair.

With reference to FIG. 9, the mechanism for moving the carriage back and forth on the frame of the machine comprises a longitudinally extending pneumatic device 158 comprising a cylinder 159 and a piston rod 161. The cylinder 159 is secured to the frame of the machine on approximately the longitudinal center line thereof and extends longitudinally of the machine below the pneumatic device 139. The piston rod 161 is fastened to a bracket 162 which in turn is secured to the forward pair of cross braces 156 and 157. Thus, when the piston rod 161 is extended, the carriage 133 and the two breaker sections 131 and 132 are moved forwardly, and when the piston rod is retracted, the carriage and the two sections 131 and 132 are moved rearwardly.

The mechanism for swinging the two sections 131 and 132 open comprises the previously mentioned pneumatic device 139 which includes a cylinder 166 and the rod 138. The cylinder 166 is mounted for longitudinal sliding movement on the braces 156 and 157 by two tubular bearings or bushings 167 and 168 (FIG. 9) which are respectively mounted in holes formed in the bracket 162 and a similar bracket 169 on the rearward pair of cross braces 156 and 157. The brackets 162 and 169 are secured to the cross braces 156 and 157 of the carriage and support the bushings 167 and 168, and the cylinder 166 is slidably mounted in the two bushings 167 and 168.

With reference to FIGS. 5, 6 and 7, the breaker mechanism for opening the sections 131 and 132 further comprises a pair of generally longitudinally extending breaker arms 171 and 172, each of the arms having one end pivotally connected by a pin 173 to one of the two breaker sections 131 and 132 and its other end pivotally connected by another pin 174 to the rearward pair of cross braces 156 and 157 of the carriage. Each pin 173 is connected to a pair of vertically spaced lugs 176 (FIG. 8) formed on the associated breaker sections 131 and 132, each of the lugs 176 having a hole formed therein which receives the pin 173.

To support the midsections of the breaker arms 171 and 172, a roller 178 is rotatably mounted on each breaker arm 171 and 172, the arms 171 and 172 extending between the cross braces 156 and 157 and the rollers 178 being supported on the lower forward brace 157.

To the rearward ends of the arms 171 and 172 are rigidly secured links 181 and 182 respectively. The links 181 and 182 extend generally laterally inwardly from the associated arms 171 and 172, and the inner end of each link 181 and 182 has an elongated slot 183 formed therein which receives a pin 84 in sliding movement therewith. The pins 184 in turn are fastened to a bracket 186 (FIGS. 5 and 7) which is secured to and movable with the cylinder 166 of the pneumatic device 139.

During the period when the carriage is moving forwardly to place the two breaker sections 131 and 132 over the top of the plate 28 (FIG. 6), the piston rod 138 of the pneumatic device 139 is in a retracted position within the cylinder 166 and the cylinder is in the forwardmost position. To open the two sections 131 and 132, air under pressure is admitted to the cylinder 166 behind the piston, thus forcing the piston rod 138 and the hinge connection 136 forwardly. The pivotal connections at 173 between the arms 171 and 172 and the breaker sections cause the two sections 131 and 132 to swing open as the hinge connection 136 moves forwardly through the position shown in dashed lines in FIG. 7 to the position shown in full lines in FIG. 7. As the hinge connection 136 moves forwardly the two pivotal connections 173 swing laterally inwardly as the two arms 171 and 172 pivot on the pins 174. Such pivotal movement of the arms 171 and 172 results in similar movement of the links 181 and 182, and rearward movement of the bracket 186 and the cylinder 166. Forward movement of the hinge connection 136 continues until each arm 171 and 172 is substantially in alignment with the hinge connection 136, as shown in full lines in FIG. 7, at which time the arms of each of the C-shaped sections 131 and 132 are in longitudinally extending positions. Such orientation of the arms of the sections 131 and 132 is important because it permits the sections to be moved rearwardly clear of a case without interference with the case.

After the sections 131 and 132 have been swung to break a case open as described above, the pneumatic device 158 is actuated to retract the carriage 133 rearwardly to the position shown in FIG. 5 where the breaker sections 131 and 132 are located above the elevator rollers 44. After the carriage has been retracted, the breaker sections are closed by admitting air to the cylinder 166 forwardly of the piston. A rearwardly directed force is exerted on the hinge connection 136 and, simultaneously, a forwardly directed force is exerted on the cylinder 166 and on the bracket 186. The cylinder 166 and the bracket 186 shift forwardly causing the arms 171 and 172 to swing laterally outwardly, and the hinge connection 136 moves rearwardly until the breaker sections 131 and 132 again assume the positions shown in FIG. 5.

The movement of the cylinder 166 and the bracket 186 is advantageous because it serves to spread the two pivotal connections 173 apart slightly so that the piston rod 138 may be retracted without binding of the parts. Such binding might otherwise occur because, as previously mentioned, each of the arms 171 and 172 is substantially aligned with the hinge connection 136 when the piston rod 138 is in its extended position.

As shown in FIG. 1, the forward outer corners of the two sections 131 and 132 are preferably notched at 191 so that these corners may clear the two tracks 151 as the sections swing between the open and closed positions.

As previously stated, the two vertically spaced blades 26 and 27 form slits in the top and bottom sides of a case as the case is moved forwardly by the carriage. The lower blade 26 is fastened to the blade holder 91 which also supports the blade 23. As is best shown in FIG. 3, the blade 23 extends rearwardly from the holder 91, and the other blade 26 extends generally upwardly from the holder 91 at approximately the level of the lower surface of a case. The portion of the holder 91 which is rearward of the blade 26 forms an upwardly and forwardly sloping cam surface, and when a case is moved forwardly, the lower forward corner edge of the case engages such cam surface and tends to push it forwardly. It will be recalled that the holder 91 is free to pivot slightly upon rotation of the shaft 92, but the tension spring 96 holds the blade 26 firmly against the underside of the case.

The top blade 27 is fastened by a blade holder 202 to the forward end of a top blade arm 201. The blade holder 202 is normally secured in fixed relation to the arm 201 by a bolt 203, but by loosening the bolt 203 the position of the blade holder 202 may be pivotally adjusted relative to the arm 201.

The top blade arm 201 is pivotally supported by a top blade support or bracket 206 (FIGS. 1 and 2) on the frame 20 of the machine. The support 206 has an inverted U configuration and spans the carriage, the ends of the arms of the U being rigidly secured to the frame 20. A horizontal laterally extending pin 207 extends between the arms of the U-shaped bracket 206 and pivotally supports a tubular mounting member 208 which has the top blade arm 201 rigidly secured thereto. Thus, the arm 201 and the blade holder 202 may swing upwardly and downwardly about the axis of the pin 207, the weight of the arm 201 and the blade holder 202 normally maintaining the blade 27 in a lower position against the top side of a case being moved forwardly as previously explained.

The portion of the blade holder 202, which is rearward of the blade 27, forms a cam surface and a case moving forwardly cams the blade holder 202 upwardly slightly. The holder slides across the top side of the case but the blade of course cuts through the case.

With reference to FIG. 2, downward movement of the arm 201 and the blade 27 is damped by a pneumatic device 211 including a longitudinally extending cylinder 212 and a piston rod 213. The rearward end of the cylinder 212 is secured to the frame of the machine and the forward end of the piston rod 213 is pivotally connected to a link 214 which is rigidly secured to approximately the center of the tubular member 208 and extends downwardly to the piston rod 213. Swinging movement of the arm 201 about the axis of the pin 207 causes the piston rod 213 to move in the cylinder 212, and downward movement of the arm 201 is damped by the pneumatic device 211 while upward movement of the arm 201 is not damped.

As previously mentioned, a case moved forwardly by the two sections 131 and 132 is brought to rest on top of the plate 28. The plate 28 is supported by the braces 47 of the elevator 21, such support comprising a plurality of vertically extending bolts 221 (FIG. 7) and a plurality of tubular spacers 222 (FIG. 3). The spacers 222 are positioned between the braces 47 and the underside of the plate 28, and the bolts 221 extend through the spacers 222 and secure the plate 28 to the braces 47.

The dumping mechanism 29 comprises four longitudinally extending bars 231 (FIGS. 1 and 7) which are rigidly secured to a laterally extending shaft 232. The bars 231 are spaced along the length of the shaft 232 and extend rearwardly from the shaft 232 which is located just forwardly of the plate 28, as shown in FIG. 7. The ends of the shaft 232 are mounted for rotation on the frame 20 of the machine by bearings 233. The forward portion of the plate 28 has four longitudinally extending slots 234 formed therein, the slots 234 being aligned with the bars 231 so that the plate 28 may be moved vertically past the bars 231 with the bars 231 passing through the slots 234. Thus, as illustrated in FIG. 4, when the plate 28 is moved downwardly with a case thereon, the case will be deposited on the bars 231 and the plate 28 will continue its downward movement to the position shown in FIG. 2, leaving the case supported by the bars 231.

With reference to FIG. 2, the shaft 232 and the bars 231 are adapted to be pivoted in the clockwise direction by a vertically extending pneumatic device 237 including a cylinder 238 and a piston rod 239. The cylinder 238 is supported by a pivotal connection at 241, and the rod 239 extends upwardly and is pivotally connected at 242 to an actuating arm 243 which is rigidly secured to one end of the shaft 232. The piston rod 239 is shown in its retracted position in FIG. 2, and in such position the bars 231 extend substantially horizontally of the machine. When the piston rod 239 is extended from the cylinder 238, it swings the arm 243 and the bars 231 upwardly in the clockwise direction as seen in FIG. 2 to the point where the bars 231 are at approximately a 45° angle from the horizontal. Such pivotal movement is sufficiently far to cause a case being supported on the bars 231 to be dumped in inverted position on top of the table 30, as shown in FIG. 10 at 31e. Subsequent retraction of the piston rod 239 returns the bars 231 to their horizontal positions in preparation for the next case.

The table 30 (FIG. 1) includes a generally flat, horizontal working surface 246 having a rectangular cut-out 247 formed therein forwardly of and at substantially the same height as the bars 231. With reference to FIGS. 1 and 2, a rectangular movable panel 248 is positioned in the cut-out 247, and the rearward edge of the panel 248 is hingedly connected to the frame of the table by a hinge 249. The movable panel 248 is normally held in an upwardly tilted position, shown in FIGS. 1 and 2, by a spring 250 (FIG. 2) but the weight of a case resting on the panel 248 is sufficient to compress the spring and cause the panel 248 to swing downwardly a short distance about the axis of the hinge 249 to a stop on the frame of the table. As will be explained hereinafter, a dump limit switch 251 (FIG. 2) is mounted on the frame of the table below the panel 248, and such downward movement of the panel 248 actuates the switch 251.

As previously mentioned, handling of the two parts of a severed case once the two parts have been dumped on the panel 248 may be accomplished either manually or by an automatic conveyor designed to move the two parts toward the right as seen in FIG. 1. A stop bar or flange 256 may be provided at the forward edge of the table to prevent a case, or the articles in a case, from falling off the surface 246. Electrical control switches 257 (FIG. 1) and an indicator light 258 may also be provided at this location for the convenience of an operator.

As mentioned above, the various mechanisms of the machine are actuated by a pneumatic device 56 (FIG. 3) which moves the elevator up and down, a pneumatic device 139 (FIG. 9) which opens and closes the two sections 131 and 132 of the breaker mechanism, a pneumatic device 158 (FIG. 9) which moves the breaker carriage forwardly and rearwardly, and a pneumatic device 237 (FIG. 2) which swings the bars 231 of the dump mechanism. The pneumatic devices include solenoid actuated valves, energization of the solenoids causing extension or retraction of the piston rods. Energization of the solenoids is controlled by a number of switches in a control circuit schematically illustrated in FIG. 14.

Figure 14:
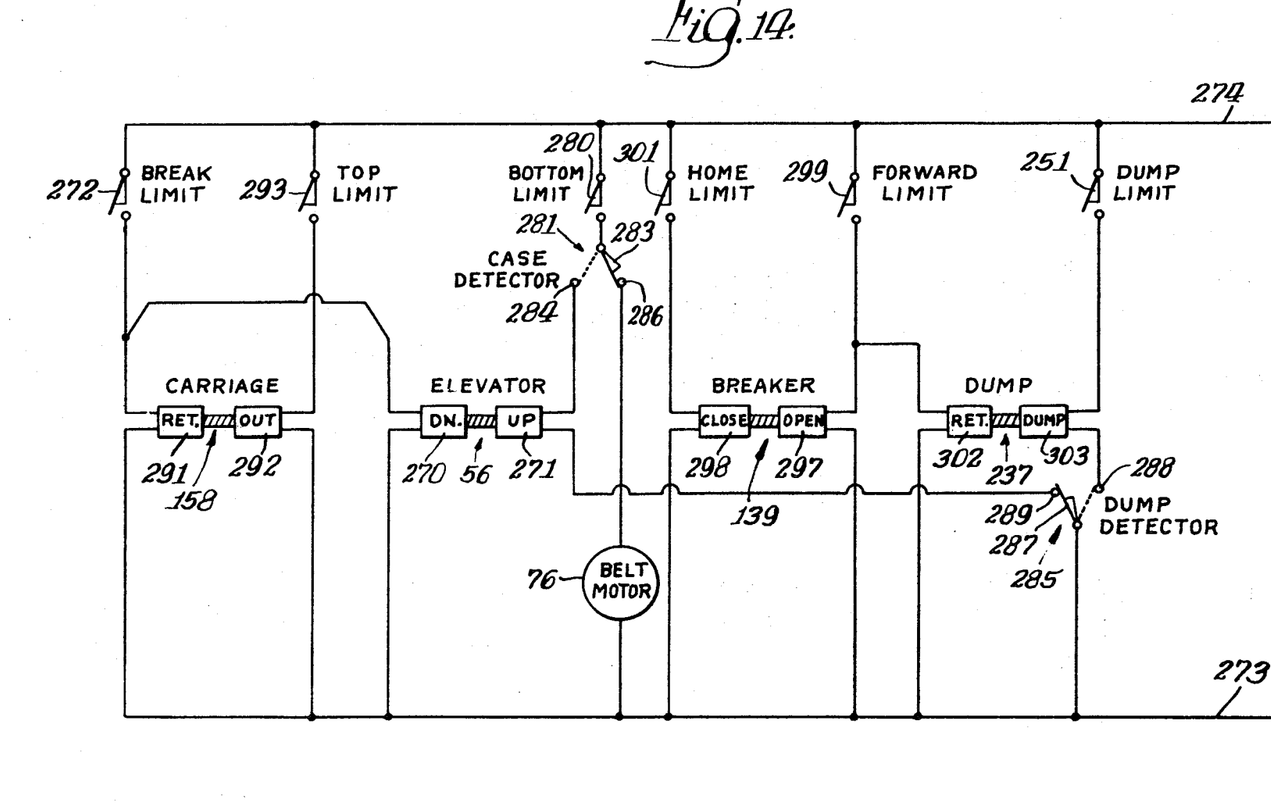
FIG. 14 is a schematic diagram of a control system of the machine.

With reference to FIG. 14, the pneumatic device 56 for the elevator includes a down solenoid 270 which, when energized, permits the elevator to move downwardly, and an up solenoid 271 which, when energized, causes the elevator to move upwardly. The two solenoids 270 and 271 control a "three-way" valve which will remain in the position it was last actuated to by one solenoid until it is actuated to its other position by the other solenoid. The down solenoid 270 is connected to be energized through a break limit switch 272 by a pair of power lines 273 and 274. When the switch 272 is closed, current flows through the switch 272 and through the solenoid 270, thereby actuating the associated valve to a position where it exhausts the air from the cylinder and permits the elevator to move downwardly by force of gravity. With reference to FIG. 9, the switch 272 is fastened to the rearward cross brace 157 of the carriage. A finger 274 is connected to the cylinder 166 of the pneumatic device 139 by a strap and is positioned to engage an actuating arm 276 of the switch 272 when the cylinder 166, and the finger 274 fastened thereto, shift rearwardly. Such rearward movement of the cylinder 166 takes place as the breaker mechanism is breaking a case apart. Therefore, as soon as the breaker mechanism has been fully opened, the solenoid 270 is energized to permit the elevator to move downwardly.

Upward movement of the elevator is controlled by a bottom limit switch 280, a case detector switch 281, and a dump detector switch 282. The bottom limit switch 280 (FIG. 9) is fastened to the frame of the machine below the elevator. An actuating bracket 281 is secured to a brace of the elevator, and the switch 280 is closed by engagement with the bracket 281 only when the elevator is in its lowermost position.

The case detector switch 281 is shown in FIGS. 4 and 8 and is located at the forward end of travel of a case being moved by the infeed conveyor 70 onto the rollers of the elevator. The switch 281 includes a finger 282 which, when pressed toward the right as seen in FIG. 8 by a case, causes closure of a switch arm 283 (FIG. 14) with a stationary contact 284. When there is no case on the rollers 44, the switch arm 283 is in its normal position where it engages another stationary contact 286.

The dump detector switch 282 (FIG. 2) is located at the lower end of the pneumatic device 237 of the dumping mechanism and is actuated by the weight of a case resting on the bars 231 and pressing the pneumatic device 237 downwardly. Without the weight of a case on the bars 231, a switch arm 287 (FIG. 14) of the switch 282 is in engagement with a stationary contact 289, and when there is a case on the bars 231, the switch arm 287 is in engagement with another stationary contact 288 of the switch 282.

Thus, the up solenoid 271 will be energized only when, simultaneously, the bottom limit switch 280 is closed, indicating that the elevator is presently in its lowermost position, the actuating arm 283 of the switch 281 is in engagement with the contact 284, indicating that a case is presently on the elevator and is in engagement with the finger 282, and the arm 287 is in engagement with the contact 289, indicating that a case is not resting on the bars 231 of the dump mechanism 29. Energization of the solenoid 271 actuates the associated valve to its position where air under pressure is admitted to the cylinder below the piston to move the elevator upwardly. The valve will then remain in this position regardless of whether the solenoid 271 is energized, until the down solenoid 270 is energized to again shift the valve.

The pneumatic device 158 for the carriage comprises a return solenoid 291 and an out solenoid 292, these two solenoids controlling a "four-way" valve which initiates rearward and forward movements of the carriage.

Energization of the return solenoid 291 actuates the valve to admit air under pressure to the cylinder forwardly of the piston and to exhaust the rearward end of the cylinder, whereas energization of the out solenoid 292 actuates the valve to admit air under pressure rearwardly of the piston and to exhaust the forward end of the cylinder. The valve is constructed to remain in either of its two positions until actuated to its other position by energization of the solenoid associated with the other position.

The other two pneumatic devices 139 and 237, the operation of which will be described hereinafter, are controlled by "four-way" valves similar to the valve described above for the pneumatic device 158.

The return solenoid 291 is connected to be energized through the break limit switch 272 so that the carriage will be retracted rearwardly as soon as the two sections 131 and 132 of the breaker mechanism are swung to their open positions. The out solenoid 292 is connected to be energized through a top limit switch 293 (FIG. 9) fastened to the frame of the machine above the pneumatic device 56 for the elevator. An actuating bracket 294 secured to the elevator is located to engage and close the limit switch 293 when the elevator has moved to the upper limit of its travel. Thus, as soon as the elevator reaches its uppermost position, the switch 293 is closed and starts the carriage moving forwardly.

The pneumatic device 139 for opening and closing the breaker mechanism comprises an open solenoid 297 and a close solenoid 298 which control a "four-way" valve of the type previously described. The open solenoid 297 is connected to be energized through a forward limit switch 299 (FIG. 9) secured to the frame 20 of the machine in the path of the carriage. The switch 299 is positioned to be engaged and closed by a bracket 273 which is fastened to and movable with the carriage. When the carriage reaches its forwardmost position, the switch 299 is closed by the bracket 273 and the solenoid 297 is energized to cause opening of the two sections 131 and 132 of the breaker mechanism.

The other solenoid 298 of the pneumatic device 139 is connected to be energized through a home limit switch 301 (FIG. 9) secured to the frame 20 rearwardly of the carriage. The switch 301 is located to be closed by the rearward cross brace 157. Thus upon movement of the carriage to its rearwardmost position, the brace 157 closes the switch 301 and energizes the close solenoid 298, causing the two sections 131 and 132 of the breaker mechanism to close.

The pneumatic device 237 for the dump mechanism includes a return solenoid 302 and a dump solenoid 303. The dump solenoid 303 is connected to be energized through the normally closed dump limit switch 251 and the dump detector switch 282, previously described. Thus, the solenoid 303 will be energized to swing the bars 231 clockwise when the switch 251 is closed, indicating that there is no case on the panel 248, and when the switch arm 287 is in engagement with the contact 288, indicating that a case is resting on the bars 231. The return solenoid 302 is connected to be energized through the forward limit switch 299. Consequently, with the bars 231 in an upwardly inclined position after having dumped a case on the panel 248, the return solenoid 302 will be energized to return the bars 231 to their horizontal positions as soon as the carriage has moved to its forwardmost position and has closed the switch 299.

The circuit shown in FIG. 14 also includes the electric motor 76 which drives the belt infeed conveyor 70. The motor 76 is connected to be energized through the case detector switch 281 and through the bottom limit switch 280. Therefore, the motor 76 will be energized only when the switch arm 283 engages the contact 286, indicating that there is no case on the rollers 44 of the elevator, and when the bottom limit switch 280 is closed, indicating that the elevator is in its lowermost position. The motor 76 will be deenergized as soon as a case moves on to the rollers 44 and actuates the switch 281. The machine also includes an air compressor 306 (FIG. 8), an electric motor 307 for driving the compressor 306, and a compressed air tank 308 connected to the compressor outlet. The various pneumatic devices of the machine are of course connected to the tank 308, and the various solenoid valves control the flow of compressed air to and from the pneumatic devices. The motor 307 is preferably driven continuously, and for this reason it does not appear in the control circuit shown in FIG. 14.

The operation of the machine may be briefly summarized as follows: cases to be cut open are positioned on the infeed belt conveyor 70, and each time the elevator 21 is in its lower position and there is no case on the rollers 44, the conveyor drive motor 76 is energized and a case will be pushed onto the rollers 44. Such a case will engage the switch 281 and actuate the elevator pneumatic device 56 to move the case upwardly between the two knives 22 and 23 and form vertical slits in the forward and rearward sides of the case. As soon as the elevator reaches its uppermost position, the top limit switch 293 is closed and the carriage pneumatic device 158 is actuated to push the carriage and the case forwardly between the two knives 26 and 27 thereby forming longitudinally extending slits across the bottom and top sides of the case, the latter two slits being in alignment with the previously formed slits. As soon as the carriage reaches its forwardmost position, the switch 299 is closed thereby actuating the breaker pneumatic device 139 to swing the two sections of the breaker apart and break the case open. Such action closes the switch 272 and retracts the carriage, and also exhausts the pneumatic device 56 to permit the elevator, including the plate 28, to move downwardly and place the two parts of the case on the bars 231. The weight of the two parts on the bars actuates the switch 282 and causes the parts to be dumped onto the panel 248 of the table. An operator standing at the table then removes the two parts from the panel 248 for further processing. The bars 231 are subsequently returned to their horizontal positions when the carriage, in the next cycle moves forwardly and closes the switch 299.

The machine will automatically repeat the foregoing cycle as long as there are cases on the infeed conveyor 70, provided however that there is no case resting on the panel 248 of the table 30. For example, if an operator does not remove a case from the panel 248, the next subsequent case will be advanced through the cycle to the point where it is resting on the bars 231 but it will advance no further because the weight of the previous case on the panel 248 holds the switch 251 open and thus prevents the pneumatic device 237 of the dump mechanism from operating. Further, the weight of the case on the bars 231 holds the switch arm 287 of the switch 282 against the contact 288 and thus prevents the elevator from moving the next case upwardly. Of course, as soon as the operator removes the first case from the panel 248, the machine returns to operation. The spring 250 is preferably chosen so that the switch 251 will remain open even when there is one-half a case on the panel 248.

A machine embodying the invention is highly advantageous because it is capable of automatically slitting and breaking open a continuous succession of cases in rapid succession. All of the cases are cut by the machine at exactly the same location without damage to the contents of the case. Further, the machine includes suitable safeguards for stopping operation of the machine when an operator is slow in removing a case from the machine after it has been slit.

The machine is especially useful for cutting open cases filled with cartons of cigarettes preparatory to placing tax stamps on the packages of cigarettes. Such cases contain two tiers of cartons, the cartons of one tier being stacked in end-to-end relation with the cartons of the other tier. The cases are placed on the infeed conveyor 70 with the long dimensions of the cartons extending laterally of the machine. The blades are located midway between the centering shoes 108 and 109, and consequently the case is severed into two equal parts, each part including one tier of cartons. The case parts are dumped on to the panel 248 in inverted position, i.e. with the open side of each case part facing downwardly and the cartons standing on end. The two parts of the case may be lifted upwardly by an operator, leaving the cartons standing on the panel 248 and available for further processing.

I claim:

1. A machine for automatically cutting a case into two parts and breaking the two parts open, comprising a pair of first cutting blade means, moving means for moving a case past said first cutting blade means to form slits in two opposed sides of the case, a pair of second cutting blade means, and combination moving and breaking means including two relatively movable sections for receiving the case from the moving means and operable to move the case past said second cutting blade means to form slits in two other opposed sides of the case, the four slits thus formed being in a single plane and joined at their ends and thereby dividing the case into two parts, said combination moving and breaking means further including actuator means for moving said two sections relative to each other to break said case into said two parts.

2. A machine for automatically cutting a case into two parts and breaking the two parts open, comprising a pair of first cutting blade means, moving means for moving a case past said first cutting blade means to form slits in two opposed sides of the case, a pair of second cutting blade means, and combination moving and breaking means including two relatively movable sections for receiving the case from the moving means and operable to move the case past said second cutting blade means to form slits in two other opposed sides of the case, the four slits thus formed being in a single plane and joined at their ends and thereby dividing the case into two parts, said combination moving and breaking means further including actuator means for moving said two sections relative to each other to break said case into said two parts, said two sections of said combination moving and breaking means being hingedly connected together, and said actuator means being operable to swing said two sections about said hinge connection.

3. A machine for automatically cutting a case into two parts and breaking the two parts open, comprising a pair of first cutting blade means, moving means for moving a case past said first cutting blade means to form slits in two opposed sides of the case, a pair of second cutting blade means, and combination moving and breaking means including two relatively movable sections for receiving the case from the moving means and operable to move the case past said second cutting blade means to form slits in two other opposed sides of the case, the four slits thus formed being in a single plane and joined at their ends and thereby dividing the case into two parts, said combination moving and breaking means further including actuator means for moving said two sections relative to each other to break said case into said two parts, said two sections being movable by said actuator means between an open position and a closed position, said two sections forming an enclosure which receives a case when in said closed position, and said two sections being swung open when in said open position.

4. A machine for automatically cutting a case into two parts and breaking the two parts open, comprising a pair of first cutting blade means, moving means for moving a case past said first cutting blade means to form slits in two opposed sides of the case, a pair of second cutting blade means, and combination moving and breaking means including two relatively movable sections for receiving the case from the moving means and operable to move the case past said second cutting blade means to form slits in two other opposed sides of the case, the four slits thus formed being in a single plane and joined at their ends and thereby dividing the case into two parts, said combination moving and breaking means further including actuator means for moving said two sections relative to each other to break said case into said two parts, said two sections being movable by said actuator means between an open position and a closed position, said two sections when in said closed position forming an enclosure having an open bottom side, said two sections when in said open position being swung open, and said moving means comprising a generally vertically movable elevator for moving a case upwardly through said open side and into said enclosure.

5. A machine for automatically cutting a case into two parts and breaking the two parts open, comprising a pair of first cutting blade means, moving means for moving a case past said first cutting blade means to form slits in two opposed sides of the case, a pair of second cutting blade means, and combination moving and breaking means including two relatively movable sections for receiving the case from the moving means and operable to move the case past said second cutting blade means to form slits in two other opposed sides of the case, the four slits thus formed being in a single plane and joined at their ends and thereby dividing the case into two parts, said combination moving and breaking means further including actuator means for moving said two sections relative to each other to break said case into said two parts, said two sections including a first portion for engaging a case and moving the case past said second cutting blade means, and a second portion for engaging the two parts of a case and breaking open the two parts when said two sections are moved relative to each other by said actuator means.

6. A machine for automatically cutting a case into two parts and breaking the two parts open, comprising first cutting blade means, moving means for moving a case past said first cutting blade means to form slits in two opposed sides of the case, second cutting blade means, and combination moving and breaking means comprising two sections, means pivotally connecting said two sections together for relative swinging movement between open and closed positions, said two sections forming an enclosure when in said closed position for receiving a case from said moving means, first actuator means connected to said two sections for moving said two sections and a case past said second cutting blade means to form slits in two other opposed sides of the case, the four slits thus formed being in a single plane and joined at their ends and thereby dividing the case into the two parts, and second actuator means connected to said two sections for moving said two sections from said closed position to said open position.

7. A machine for cutting a case into two parts and breaking the case open, comprising a first pair of horizontally spaced cutting blades, vertically movable elevator means adapted to move a case between said first pair of blades to form vertical slits in two opposed sides of the case, a second pair of vertically spaced cutting blades, horizontally movable breaker means adapted to receive the case from said elevator means and to move the case between said second pair of vertically spaced cutting blades to form horizontal slits in two other opposed sides of the case, said first and second pairs of cutting blades being located in substantially the same plane, whereby four adjoining slits are formed in said case and said case is divided into two parts, said breaker means including two pivotally connected sections engageable with a case, and means to pivot said two sections relative to each other after the case has been divided into said two parts and thereby swing said two parts away from each other to break the case open.

8. A machine as in claim 7, and further including dumping means adapted to receive the two parts of a case from the breaker means and to dump the two parts on a case-receiving surface with the cut open side of each part facing downwardly.

9. A machine as in claim 8, wherein said dumping mechanism comprises a dumping arm which is pivotable about a horizontal axis between a generally horizontal position and an upwardly inclined position, said machine further including means for carrying the two parts from said breaker mechanism and placing the two parts on said dumping arm when said dumping arm is in said horizontal position, and said dumping mechanism further including means for pivoting said dumping arm from said horizontal position to said inclined position in response to the weight of a case on said dumping arm and thereby dump the two parts of a case.

10. A mechanism for breaking a case open, comprising a pair of breaker sections, hinge means connecting said breaker sections, actuator means connected to said hinge means for moving said hinge means forwardly and rearwardly, and a pair of breaker arms each having one end pivotally connected to one of said breaker sections at a location which is spaced laterally outwardly from said hinge means, whereby forward and rearward movements of said hinge means due to said second actuator means causes said breaker sections to swing between open and closed positions about said pivotal connections with said breaker arms, said breaker sections being adapted to receive a case when in said closed position and to break the case open when swung to said open position.

11. In combination with means for slitting four sides of a case, the four slits lying in one vertical plane and thus dividing the case into two parts, a mechanism for breaking the two parts of the case open, said mechanism comprising a pair of hingedly connected breaker sections, each of said sections being adapted to engage one of said parts of said case, and actuator means connected to said hinge connection between said sections for moving said hinge connection and thereby swinging said one section and one of said case parts engaged thereby approximately 90° to place the cut side of said one part facing in one direction and oppositely swinging said other section and the other of said case parts engaged thereby approximately 90° to place the cut side of said other part facing in said one direction.

12. The combination of claim 11, and further including means for moving said pair of sections away from the two case parts after the parts have been broken open by said mechanism, and means for tipping said two case parts approximately 90° on a horizontal axis to position the two case parts with the two cut sides facing downwardly.

13. A mechanism for breaking a case open after the case has been cut into two parts, said mechanism comprising two hingedly connected breaker sections, actuator means connected to said hinge connection for moving said hinge connection forwardly and rearwardly, a pair of breaker arms, each of said arms having one end pivotally connected to a breaker section at a point which is laterally spaced from the path of movement of said hinge connection, the other end of each of said arms being pivotally connected to a stationary support, said pivotal connections between said arms and said sections swinging laterally inwardly toward each other as said hinge connection is moved forwardly and thereby turning each of said sections approximately 90°.

14. A mechanism as in claim 13, wherein each of said arms is substantially aligned with said hinge connection when said hinge connection is in its forwardmost position, and further including means connected to move said breaker arms to swing said pivotal connections between said arms and said sections laterally away from each other as said hinge connection is moved rearwardly.

15. A mechanism as in claim 14, wherein said actuator means comprises two relatively movable portions, one of said portions being connected to said hinge connection and the other of said portions being connected to said breaker arms.

16. A control system for a machine including first and second pairs of cutting blades, first moving means for moving a case from a first position between said first pair of blades to a second position, conveyor means for moving a case to said first position on said first moving means, and combination moving and breaker means for moving a case from said second position to a third position and breaking the case open at said third position, said control system comprising first switch means for energizing said conveyor means in response to said first moving means being in position to receive a case from said conveyor means and the absence of a case at said first position, second switch means for energizing said first moving means in response to a case reaching said first position, third switch means for energizing said combination moving and breaking means to move a case from said second position to said third position in response to a case reaching said second position, and fourth switch means for energizing said combination moving and breaking mechanism to break open a case in response to said mechanism moving a case to said third position.

17. A control system as in claim 16, said machine further including second moving means for moving a case from said third position to a fourth position on a dumping mechanism, said control system further comprising fifth switch means for actuating said second moving means to move a case to said fourth position in response to said combination moving and breaking mechanism breaking a case open, and sixth switch means responsive to the presence of a case on said dumping mechanism for disabling said second switch means from energizing said first moving means when a case is on said dumping mechanism.

18. A control system as in claim 17, wherein said machine further includes a panel and said dumping mechanism is operable to dump a case on said panel, and said sixth switch means further being operable to energize said dumping mechanism to dump a case on said panel in response to the presence of a case on said dumping mechanism, and further including seventh switch means for disabling said sixth switch means from energizing said dumping mechanism in response to the presence of a case on said panel.

19. A method for cutting a case into two parts and for breaking the two parts open, comprising the steps of moving a case in one direction past first cutting blade means to form slits in two opposed sides of the case, moving the case in a second direction past second cutting blade means to form slits in two other opposed sides of the case, the four slits being in a single plane and dividing the case into two parts, breaking the two parts of the case open, dumping the two parts in an operator's processing area, and preventing subsequent cases from being dumped in said area until the operator removes the two parts from said processing area.

20. A method comprising the steps of moving a case in the vertical direction past first cutting blade means to form vertical slits in two opposed sides of the case, moving the case in the horizontal direction past second cutting blade means and on to a support to form horizontal slits in two other opposed sides of the case, the four slits being in a single vertical plane and dividing the case into two parts, and swinging the two parts while on said support horizontally away from each other to expose the open side of each part.

21. A method as in claim 20, and further including the step of tipping said two parts in said horizontal direction to dump the two parts in an operator's work area with the open sides of the two parts facing downwardly.

22. A method for cutting a case into two parts and for breaking the two parts open, comprising the steps of moving a case in a first direction past first cutting blade means to form slits in two opposed sides of the case, moving the case in a second direction at an angle to said first direction past second cutting blade means to form slits in two other opposed sides of the case, the four slits being in a single plane and dividing the case into two parts, breaking the two parts of the case open, moving the two parts in a third direction which is reverse to the first direction, depositing the two parts on a support, and tilting the support to dump the two parts from the support.

References Cited
UNITED STATES PATENTS

| | | | |
|---|---|---|---|
| 2,729,885 | 1/1956 | Wahl et al. | 214—305X |
| 3,386,320 | 6/1968 | Pinkham et al. | 214—305X |
| 3,457,642 | 7/1969 | Steer et al. | 30—2 |

GERALD M. FORLENZA, Primary Examiner

L. J. ORESKY, Assistant Examiner

U.S. Cl. X.R.

30—2; 214—152